W. H. CHAPMAN.
ELEVATOR BRAKE.
APPLICATION FILED MAR. 10, 1915.

1,207,861.

Patented Dec. 12, 1916.

Witnesses:
Edna Boutwell
G. N. Rumory

Inventor:
William H. Chapman
by S. W. Bates
Atty.

UNITED STATES PATENT OFFICE.

WILLIAM H. CHAPMAN, OF PORTLAND, MAINE.

ELEVATOR-BRAKE.

1,207,861.  Specification of Letters Patent.  Patented Dec. 12, 1916.

Application filed March 10, 1915. Serial No. 13,466.

*To all whom it may concern:*

Be it known that I, WILLIAM H. CHAPMAN, of Portland, in the county of Cumberland and State of Maine, have invented certain new and useful Improvements in Elevator-Brakes, of which the following is a specification.

My invention relates to elevators which are driven by polyphase alternating current motors and its object is to provide a brake mechanism which shall be silent and efficient in its operation, and a safeguard against runaway accidents in case of unsuspected interchange of two of the wires leading to the motor.

My invention is applied to brakes which are normally at the "on" position and is arranged to release the brake. This is usually done by means of a solenoid. It is well known that these solenoids operating on an alternating current are very noisy and inefficient, requiring a very much larger consumption of electrical energy than solenoids of corresponding power operated by direct current. It is also well known that electric motors driven by polyphase currents are reversed in their direction of rotation by the interchange of two of the wires leading to them. It sometimes happens that an interchange of two of the wires is made by careless workmen either at the power station supplying the current or outside on the pole lines, and in this way disastrous results are liable to follow on any elevator driven from the system, because of the fact that the solenoids usually employed to release the brake will release it just the same whichever way the leads are connected, and will thus let the elevator run in the reverse direction with nothing to check its movements as the controlling devices are rendered inoperative by the interchange. My invention on the contrary provides a brake operating device that will not release when two wires are thus interchanged and the result will be to blow out a fuse and prevent accident to the elevator.

In carrying out my invention I employ an auxiliary polyphase motor of the same phase as the main motor, the rotation of this auxiliary motor acting through suitable mechanism to relieve the brake which is normally set. This auxiliary motor is made with a rotor free from teeth so that it is noiseless when in operation.

My invention may best be understood by means of the accompanying drawing in which—

Figure 1:
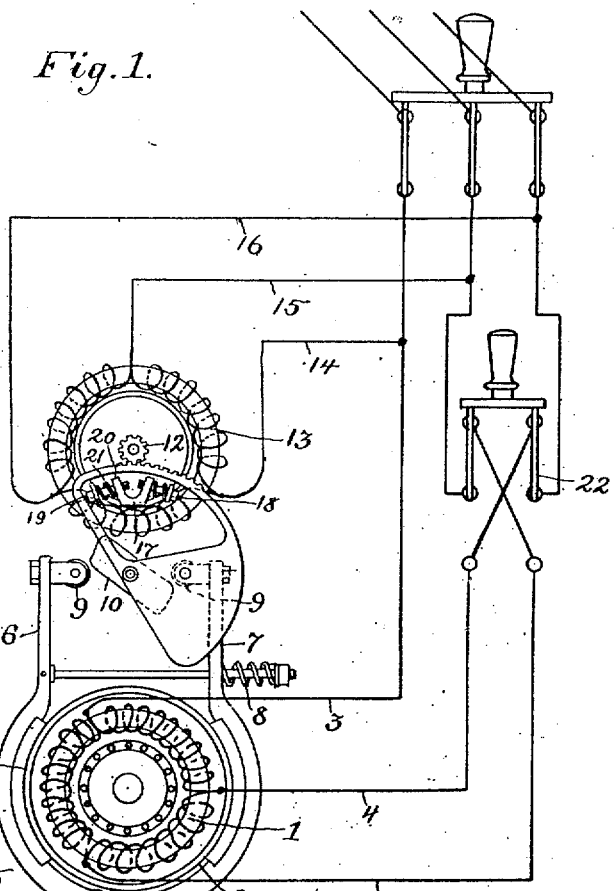
Figure 2:
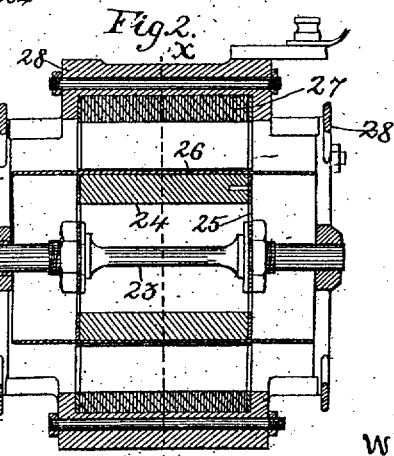

Figure 1, is a diagrammatic representation of the operating and brake controlling mechanism embodying my invention. Fig. 2, is a section through the auxiliary motor showing the construction of the motor, and Fig. 3, is a part section on the line $x$ $x$ of Fig. 2.

Referring to Fig. 1, 1 represents the main polyphase motor, 2 the brake drum connected in the usual manner with the hoisting drum, (not shown), and 3, 4 and 5 the circuit wires to which the motor is connected. The brake levers 6 and 7 are forced into engagement with the hoisting drum 2 by means of a spring 8 in the usual manner, being normally engaged or "on." The brake is released by means of a cam 10 which rotates between antifriction rolls 9 these rolls being mounted on the adjacent ends of the brake levers 6 and 7. The cam 10 is rotated by means of a geared sector 11 to which it is attached and the geared sector in turn operated by the pinion 12 of the auxiliary polyphase motor 13. The wires 14, 15 and 16 connect the motor 13 with the circuit wires 3, 4 and 5 which supply the main motor. The two motors are of the same phase, in this case each being a three phase motor. The geared sector is provided with stops whereby its motion in opposite direction is limited and as here shown I secure to a bracket 17 having two arms 20 set at an angle to each other, a pair of spring stops 18 and 19. Each of these stops is in effect a bolt extending through an opening in one of the arms 20 secured in place by a pin and having a spring 21 arranged to resist the blow from the segment. This bracket with its stops is secured to the frame of the machine and projects into an open space formed by cutting away a sector shaped portion of the geared sector. The stops 18 and 19 come in contact with the edges of this space as the geared sector rotates first in one direction and then in another. The upper edge of the sector is provided with teeth which engage the teeth of the pinion and the lower portion of the sector is made solid so that it is in effect weighted in such a way as to tend always to return to its normal position in which position the cam is out of engagement with the rolls 9 and the brake is consequently set. It is necessary in operating the elevator to provide for the reversal of the main motor without reversing the auxiliary motor. For this purpose I insert in the line between the main motor and the auxiliary motor a reversing switch 22 operated in any well known manner from the elevator or otherwise.

One of the important features of my elevator is my manner of constructing the rotor of the auxiliary motor so that it will be noiseless.

Figure 3:
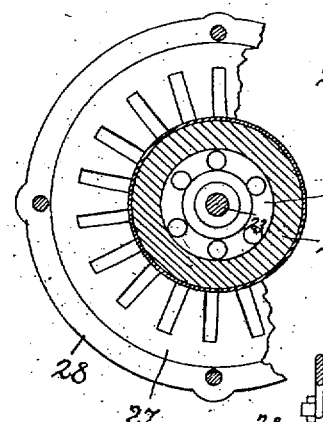

Referring now to Figs. 2 and 3, 23 represents the central shaft of the motor having on its end the pinion 12 already referred to. The rotor is made up of an iron core 24 in practice being a section of heavy wrought iron pipe. This core is secured to the shaft by plates 25 formed of copper or other good conducting material and the core is covered with a cylindrical sheath of copper extending well beyond the ends of the core to give a large radiating surface to dissipate the heat. This form of rotor runs perfectly silent because there are no teeth to vary the magnetic flux. The stator part of the motor is made up in the usual manner being a laminated iron ring 27 slotted to receive the coils. The parts are supported by a suitable frame 28 which it is not necessary to particularly describe. The relation between the geared sector and the pinion is such that the weight on the sector tends to turn the rotor backward when the current is switched off from the motor. When the current is switched on it drives the motor forward and lifts the weight at the same time the brake is released.

The advantages of my construction are as follows: The reversal of any two of the feed wires any where on the lines causes the auxiliary motor as well as the main motor to reverse and the brake to remain set; any desired leverage may be obtained by varying the relative sizes of the pinion and the geared sector and any desired range of movement obtained as the motor will continue to run until the brake is released. The rotor is exceedingly simple and cheaply made and runs without noise. The auxiliary motor uses far less current than the solenoid in common use and the construction represents an important advance in the art in the direction of safety, efficiency and freedom from objectionable sounds.

I claim:

1. In an elevator, the combination with a brake and brake drum of means for normally holding the brake in engagement with the drum, an electric motor, a pinion rotated by said motor, a geared sector engaging said pinion and weighted to cause its return to its normal position, a cam connected to said sector and formed and positioned to force the brake out of engagement with the drum when the sector is rotated in one direction.

2. In an elevator, the combination with a brake and brake drum of means for normally holding the brake in engagement with the drum, an electric motor, a pinion rotated by said motor, a geared sector engaged by said pinion, said sector being weighted to return it to its normal position and having a recess formed therein a pair of spring stops within said recess positioned to limit the motion of the sector in both directions and a cam connected with said sector for causing the disengagement of the brake and its drum when the sector is rotated in one direction.

In testimony whereof I have affixed my signature, in presence of two witnesses.

WILLIAM H. CHAPMAN.

Witnesses:
S. W. BATES,
L. D. RUMERY.